United States Patent [19]

Sonobe et al.

[11] 4,030,828
[45] June 21, 1977

[54] SPECTROPHOTOMETER

[75] Inventors: Shigeru Sonobe; Makoto Watanabe, both of Katsuta; Iwao Kato, Mito; Tomoyoshi Sato, Sapporo, all of Japan

[73] Assignee: Hitachi, Ltd., Japan

[22] Filed: Mar. 23, 1976

[21] Appl. No.: 669,705

[30] Foreign Application Priority Data

Mar. 26, 1975 Japan .............................. 50-35472

[52] U.S. Cl. .............................. 356/96; 356/88; 356/100
[51] Int. Cl.² .............................. G01J 3/42
[58] Field of Search .............................. 356/80–86, 356/88, 96, 97, 98–100; 350/162 R

[56] References Cited

UNITED STATES PATENTS

| | | | |
|---|---|---|---|
| 3,171,882 | 3/1965 | Baird | 356/81 |
| 3,229,568 | 1/1966 | Webb | 356/96 |
| 3,696,247 | 10/1972 | McIntosh et al. | 356/97 |
| 3,846,024 | 11/1974 | Turner | 356/80 |
| 3,985,441 | 10/1976 | Schoeffel et al. | 356/96 |

FOREIGN PATENTS OR APPLICATIONS 1,389,897  1/1965  France .............................. 356/98

Primary Examiner—Edward S. Bauer
Assistant Examiner—F. L. Evans
Attorney, Agent, or Firm—Craig & Antonelli

[57] ABSTRACT

There is provided a multi-functional spectrophotometer allowing various measurements in which a stigmatic concave grating is employed for selecting the wavelength of the measuring light. A number of miniature type detectors are employed for detecting the diffracted light from the concave grating. Cells containing samples to be measured can be positioned either adjacent to inlet slits at the side of a light source or behind exit slits. These positions of the cells can be easily changed over one with the other. In the former position, absorbances (concentrations) of sample components for a plurality of predetermined light wavelengths can be simultaneously measured. In the later position, not only the absorbance characteristic curve of the sample can be determined, but also the absorbance, fluorescence and turbidity of the sample for a give wavelength can be measured.

5 Claims, 4 Drawing Figures

SPECTROPHOTOMETER

BACKGROUND OF THE INVENTION

1. Field of the Invention

The present invention relates in general to a spectrophotometer and in particular to a multifunctional spectrophotometer which allows a plurality of various measurements.

2. Description of the Prior Art

A spectrophotometer has been hitherto known which utilizes generally a plane grating as a dispersing element, a concave mirror as an element for collimating or converging a light beam, and a photomultiplier as a detector. It is also known that a monochromator composed of a concave grating which makes unnecessary the use of the concave mirror mentioned above can be employed for the purposes of reducing stray light and improving the aberration. However, since the concave grating requires high skill in manufacture thereof and thus becomes expensive, and is further attended by the undesirable astigmatism inherent thereto, the concave grating has not been widely employed but has been found its application only in extremely ultra violet spectrophotometers. Lately, a holographic grating has become available which is manufactured by utilizing a laser holography technic. However, such holographic grating has drawbacks that the wavelength of the diffracted light from the grating as well as the position at which the image is formed are subjected to some restriction imposed by a specific wavelength of the laser used in the manufacture of the grating. Further, because the grooves of the grating is formed by processing interference fringes photographically, the cross-section of the grooves can not be freely selected as in the case of the mechanically ruled grating lines, which makes it difficult to attain a high diffraction efficiency at a given wavelength region.

SUMMARY OF THE INVENTION

An object of the invention is to provide a multi-functional spectrophotometer of a small type.

According to a feature of the invention, a concave grating serving for both dispersing and coverging the light is employed. An inlet slit is disposed at the center of curvature of the concaved spherical surface of the concave grating which is formed with the grating constant as well as the curvature of the ruled grooves being varied so that the image of the inlet slit can be formed without aberration at a given spatial point with a given wavelength of light. The inlet slit and the light source are so mounted that the incident light falls on the concave grating perpendicularly to the grating face thereof. A plurality of exit slits are provided at the positions at which the diffracted light forms images of the inlet slit. Disposed behind the exit slits are associated detectors which may be composed of photodiodes of a small size.

When the light absorptions of a sample for a plurality of wavelengths are to be measured by the spectrophotometer according to the invention, the sample is disposed adjacent to the inlet slit at the side of the light source. When the spectroscopic absorbance characteristic is to be determined, the sample in question is positioned between the exit slit and the detector and the concave grating is rotated thereby to effect the scanning of the sample with varied wavelengths. Upon the measurement of fluorescence, the sample is located behind the exit slit and illuminated with the exciting ray of a specific wavelength which can be selectively determined in accordance with the orientation of the concave grating. Thus, the fluorescence can be measured relative to the exciting ray of the specific wavelength. In this case, the detector is disposed laterally of the sample containing cell and an optical filter which cuts the exciting ray and permits the fluorescence to pass therethrough is placed between the sample cell and the detector. With the same arrangement, the turbidity of the sample producing no fluorescence can be measured. In this measurement, the optical filter is removed. In the above measurements, a single light beam is used in combination with the inlet and exit slits each having a single slit aperture. When the exit slits, inlet slits, detectors each provided in a pair are closely disposed to each other vertically in alignment with the direction of the grating lines of the concave grating, the measurement of a sample in question in comparison with a reference sample can be performed by using double light beams.

The above and other objects, features and advantages of the invention will become more apparent from the description of embodiments of the invention. The description makes reference to the accompanying drawings.

DETAILED DESCRIPTION OF THE PREFERRED EMBODIMENTS

Figure 1:
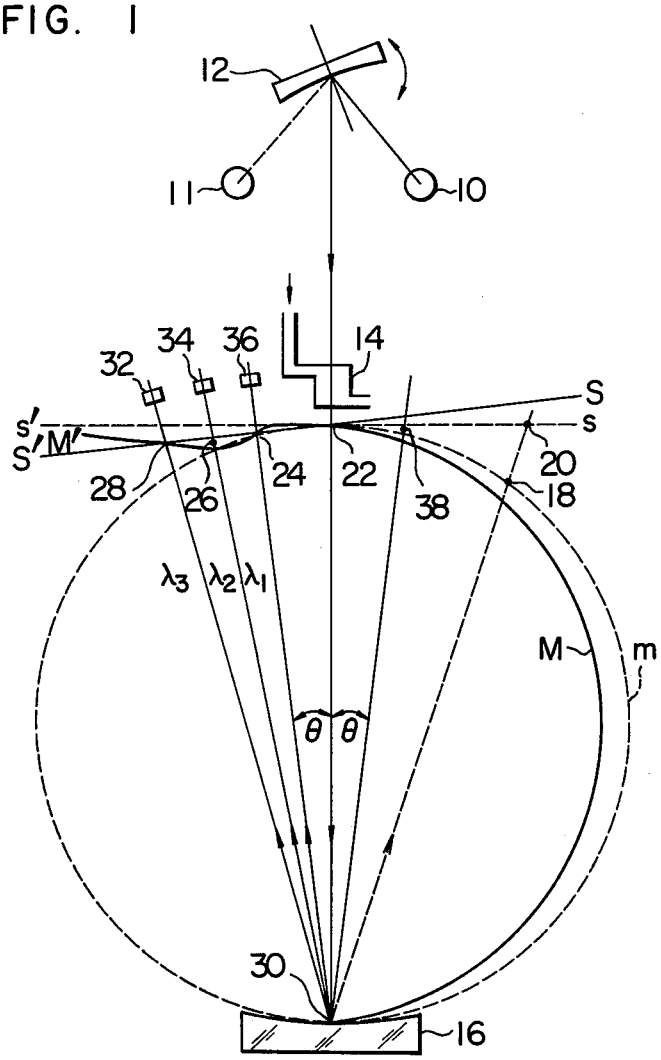
FIG. 1 is a schematic plan view of a spectrophotometer to illustrate the teaching of the invention in comparison with a hitherto known principle.

FIG. 1 shows a spectrophotometer employing a concave diffraction grating. The optical system of the illustrated apparatus is composed of light sources 10 and 11, a concave mirror 12, a flowcell 14, an inlet slit 22, a concave grating 16, exit slits 24, 26 and 28, and photodiode detectors 32, 34 and 36. The light source 10 may consist of a lamp capable of producing a continuous wavelength light such as a deuterium lamp, for example, while the light source 11 may be a mercury lamp which can emit light of a strong intensity at a specific wavelength. Either one of the light beams produced from the source lamps 10 or 11 as selectively determined in dependence upon the orientation of the concave mirror 12 will pass through the flowcell 14 and enter the inlet slit 22. The flowcell 14 through which a sample fluid flows is made of a tube having an inner diameter of 1.5 to 2 mm and a length of about 10 mm. Each of the end walls of the tubular flowcells through which the light beam passes are constituted by a transparent flat plate so as to improve the transmission of light. The inlet slit 22 is a small hole of a diameter of 1 to 1.5 mm located at the center of radius of the curved surface of the concave grating 16. The light beam having passed through the flow cell will fall onto the concave grating 16 at the engraved area thereof. When a conventional concave grating engraved with equi-distance lines is employed for the concave diffraction grating, the diffracted light rays are collected on the meridional image line $m$ and the sagittal image line $s$ indicated by broken lines in FIG. 1. The line $m$ corresponds to the Rowland's circle, and the line $s$ is a straight line extending tangentially to the Rowland's circle at the position of the inlet slit 22. As will be seen from the drawing, the concave grating 16 is disposed diametrically vertical relative to the Rowland's circle. The radius of curvature of the concave grating 16 is equal to the distance between the center 30 of the diffraction surface of the grating 16 and the inlet slit 22. The span between the points 18 and 20 at which a given straight line (shown by broken lines in FIG. 1) passing through the center 30 of the concave grating 16 intersects the lines $m$ and $s$, respectively, represents the astigmatism. The light image in the form of a point is formed only at the position of the inlet slit 22. As will be appreciated from the above description, the spectrophotometer employing a hitherto known concave grating has a low spectrum resolving power, since the image is formed on the Rowland's circle in a form of a slightly curved line extending perpendicularly to the plane of the drawing. For this reason, the spectrum purity of the light extracted through the exit slit disposed on the Rowland's circle is of rather a low quality. Further, a sufficient quantity of light is not available. These are drawbacks of the spectrophotometer utilizing a conventional concave grating.

The concave grating adapted to be employed in the spectrophotometer according to the invention is manufactured by engraving grating grooves in such a manner that a ruling tool is restrained within a plane inclined at a given angle relative to the Rowland's circle and moreover groove spacings are varied. With such concave grating, the meridional image of the inlet slit 22 is formed on a solid curved line M–M' in FIG. 1, while the sagittal image thereof is produced on a solid line S–S'. These two lines can be made substantially coincident with each other at the side opposite to the concave grating 16. Since no aberrations will occur at the intersecting points 22, 24 and 28 between the above two lines, a bright and ideal spectrum can be obtained by disposing the inlet and the exit slits at these points. The locations of the inlet and the exit slits may be exchanged with each other for substantially the same effect. Although there may arise a slight astigmatism in the region encompassed by the lines M–M' and S–S', an approximately-stigmatic monochromatic light ray can be obtained by positioning the exit slit in the above encompassed region. The shape of the curved line M–M', the direction of the line S–S' and the energy distribution relative to the wavelength of the diffracted ray may be varied by changing the cross-sectional shape of grooves which are engraved in the concave grating 16. A preferred example of the concave grating employed in carrying out the invention is described in U.S. patent application Ser. No. 463,799 filed Apr. 4, 1974, and now abandoned, and in pending divisional application thereof Ser. No. 531,156 filed Dec. 9, 1974, and assigned to the same assignee as the present application. Alternatively, a holographic concave grating may be used with substantially similar results. However, in this case, it is to be noted that the wavelength of the diffracted ray providing a spectrum having no aberration as well as the location at which the image is formed are subjected to some restriction imposed by the wavelength of a laser ray employed in the manufacture of the holographic concave grating.

As described hereinbelow, in the measurements by the spectrophotometer, there are such cases in which the component concentrations of a sample have to be measured by using three or five different wavelengths. For example, several components in a serum are measured by using ultraviolet ray. In such case, the diffraction direction of the ultraviolet ray as used lies in a narrow angular range of 6° to 7° as viewed from the center of the concave grating. Accordingly, in order to maintain the spectrophotometer in an acceptable size or dimension, the exit silts have to be positioned as closely as possible to one another. In the hitherto known spectrophotometer in which photomultipliers are used as detectors, small mirrors are positioned at the downstream side of the exit slits, whereby the emergent light beams from the exit slits are led to a place at which the associated detectors can be installed. In an embodiment of the invention, a small-sized photodiode of 2 mm in diameter is employed as the detector, which thus can be positioned immediately behind the exit slit. By virtue of this feature, the spectrophotometer according to the invention can be constructed in a small size. The concave grating employed in the spectrophotometer according to the invention has a radius of curvature of 200 mm, an external dimension of 20 × 25 mm and a mean grating constant of 1/600 mm.

Figure 2:
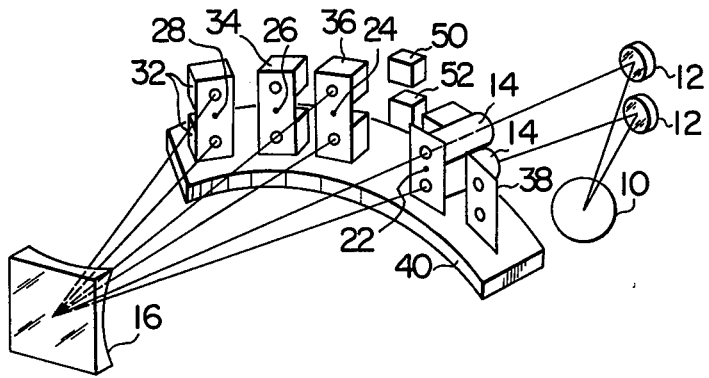
FIG. 2 is a perspective view showing an embodiment of a spectrophotometer according to the invention which is adapted for simultaneously measuring absorbances of a sample for a plurality of light wavelengths.

FIG. 2 shows in a perspective view a spectrophotometer according to the invention which is arranged to simultaneously measure the absorbance of a sample for three different wavelengths by using double beams. The illustrated spectrophotometer is assumed to be used for a liquid chromatography. Components common to the apparatus shown in FIGS. 1 and 2 are denoted by the same reference numerals. In the arrangement shown in FIG. 2, two mirrors 12 are used. It is, however, noted that the same result as in the case of a single mirror used as shown in FIG. 1 can be obtained by disposing these mirrors 12 in such a manner that light beams produced from the sources are directed to the center of the concave grating 16.

In the liquid chromatography, paired flowcells 14 are employed as positioned vertically closely to each other. A liquid mixture containing sample components and carrier liquid passes through one of the flowcells 14, while the other flow cell is adapted to pass therethrough only the carrier liquid. The inlet slits 22 is mounted in the vicinity of the exit side of the flowcells 14. The inlet slit may be of a circular, square or rectangular configuration. The paired exit slits arranged at the left hand side of the inlet slits 22 as viewed in the drawing are arrayed in a vertical close superposition to each other with a spacing between the pairs of the slits the same as that between the paired inlet slits. In other words, the exit slits are disposed at focal points of three different wavelengths. It should be appreciated that the aforementioned inlet and exit slits are so disposed that center portions of two apertures constituting the respective slits lie in the plane area encompassed by the solid lines M–M' and S–S' shown in FIG. 1. The detectors 32, 34 and 36 are disposed at the rear sides of the associated exit slits. All the aforementioned elements including the inlet slit plates, flowcells, exit slit plates and the detectors are mounted on a single base plate 40. The positions of the exit slits are made to be individually adjustable so that desired wavelengths can be taken out.

When a light source such as a deuterium lamp capable of emitting a continuous wavelength light is used as the light source 10 in the spectrophotometer of the above described construction, absorbances of wavelengths $\lambda_1$, $\lambda_2$ and $\lambda_3$ (shown in FIG. 1) by the sample component can be simultaneously measured. On the contrary, in the case of the hitherto known liquid chromatography, the measuring wavelengths are changed over through the rotation of a dispersing element. Simultaneous measurement has been heretofore impossible in the strict sense of the word notwithstanding that a complicated and voluminous structure of the spectophotometer is required. According to the invention, the performance of the spectrophotometer is remarkably improved.

Figure 3:
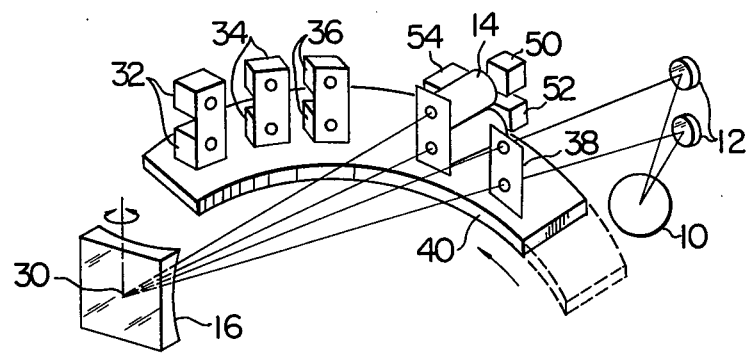
FIG. 3 is a perspective view of the embodiment shown in FIG. 2 and arranged in order to measure absorbance, fluorescence, turbidity of a sample by scanning the sample with varied wavelength light.

FIG. 3 shows in a perspective view the spectrophotometer according to the invention which is so arranged as to measure the absorbance by varying the wavelength of the measuring light beam. Mounted on the base plate 40 is a third slit 38 which is positioned at the right side of the inlet slit 22 as viewed in the drawing with an angle $\theta$ relative to the line extending through the center 30 of the concave grating 16 and the inlet slit 22. The third slit 38 is of course spaced apart from the center 30 of the concave grating 16 by a distance equal to that between the inlet slit 22 and the center 30. When the base plate 40 is rotated by an angle $\theta$ about the center axis of the concave grating 16 so that the third slit 38 lies in the path of the incident light, the inlet slit 22 comes to the position previously occupied by the exit slit 24, and the light beam $\lambda_1$ will pass through the cell 14. In this manner, the absorbance of $\lambda_1$ ray by the sample components can be measured. In this embodiment, the detectors 50 and 52 are disposed separately and independently from the rotatable base plate 40 and are so located that they take the position behind and in alignment with the sample cell and the reference cell (the cell containing only the carrier liquid) upon the angular rotation of the base plate for the angle $\theta$.

When the concave grating 16 is rotated about the axis extending through the center 30 of the grating in the direction of the ruled lines after the rotation of the base plate 40 described above, the wavelength of the light beam passing through the cell will be varied continuously. Upon the rotation of the concave grating 16, the grating face will no more be perpendicular to the incident light. However, since the rotation angle is at most in a small range of 3° to 4°, the spectrum purity will be little subjected to degradation, incurring substantially no obstacles in the measurement. In this way, the wavelength-absorbance characteristic curve can be obtained.

When the concave grating is fixedly secured in a predetermined direction so that a specific wavelength light can pass through the flow cells, it is possible to effect the measurement of absorbance at the specific wavelength. In the case in which the sample components produce fluoroescence, the quantity of fluorescence as produced is measured by the detector 54 disposed laterally of the cells. In such measurement, the lateral walls of the cells are also made of a transparent material and an optical filter is disposed between the cell and the fluorescence detector, which filter is adapted to transmit therethrough the fluorescence and cut short wavelengths serving as the exciting ray. When intensive ultraviolet ray of a specific wavelength produced by the mercury lamp 11 is to be used as the exciting ray, this can be simply attained by rotating the concave mirror 12. In this state, it is possible to measure the turbidity of a turbid liquid sample. It is to be noted that the sample in such measurement should have no tendency of producing fluorescence. No optical filter is inserted between the cell 14 and the detector 54.

The measurements of the absorbance, fluorescence and turbidity as described above can be carried out with light of any given wavelengths. Since these measurements can be easily changed over to one another, it is safe to say that the spectrophotometer according to the invention is of a multi-functional variety.

Figure 4:
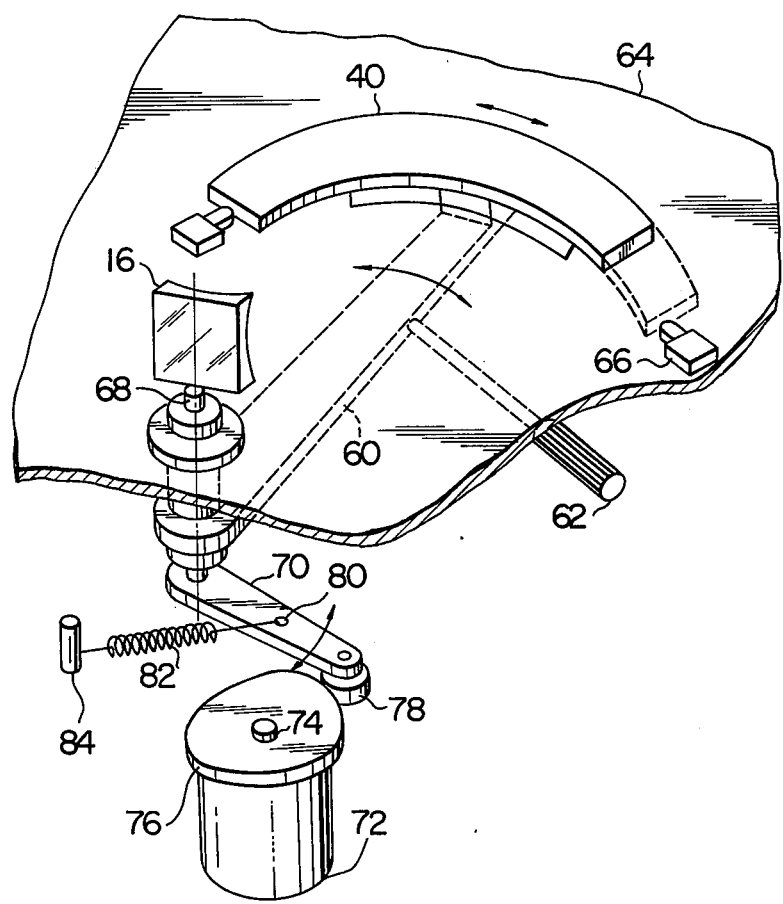
FIG. 4 is a perspective view of a mechanism employed in the embodiment shown in FIGS. 2 and 3 for changing over the states shown in FIGS. 2 and 3.

FIG. 4 shows in a perspective view a mechanism which selectively allows the operations of the embodiments shown in FIGS. 2 and 3. Referring to FIG. 4, the base plate 40 is secured to an arm 60 through an aperture provided in a base 64 which arm can be rotated for an angle $\theta$ by manually manipulating a handle 62. A pair of stoppers 66 are mounted fixedly on the base 64 and serve to define the range in which the base plate 40 can be angularly displaced. A rotatable shaft for the arm 60 is connected to the base 64 coaxially with a rotatable shaft 68 of the concave grating 16. However, these shafts can be rotated independently from each other. The shaft 68 is connected to a lever 70. When a motor 72 is driven, a rotatable shaft 74 secured thereto as well as a wavelength drive cam 76 fixed to the shaft 74 will rotate the concave grating 16 through a cam follower roll 78. A spring coil 82 having one end secured to a hole 80 formed in the level 70 and the other end fixed to a stationary pin 84 secured to the base 64 presses constantly the lever 70 against the wavelength drive cam 76.

In the illustrated mechanism, the movement of the base plate 40 is effected by rotating the arm 60 having the rotation shaft coaxially aligned with that of the concave grating 16. However, it is also possible to move the slit 38 to the position of the inlet slit 22 shown in FIG. 1 by means of a guide (not shown) formed in the base 64.

In a modification of the embodiment shown in FIG. 1, vertical arrays of three slits may be disposed at the locations of the inlet slits 22 and 38 and the exit slits 24, 26 and 28 in combination with three flow cells 14 and three detectors, wherein two flow cells are supplied with sample liquids and the remaining cell is supplied with a reference liquid. With such arrangement, it is possible to effect simultaneously the absorbance measurement at the sample and the reference cell by double light beams and the fluorescence measurement at the remaining cell by means of a single beam.

In another modification, the exit slits 24, 26 and 28 may be all removed from the area encompossed by the lines S–S' and M–M' in FIG. 1 and a plurality of miniature type photodiode detectors may be disposed in the same area to thereby carry out simultaneously the absorbance measurements at the corresponding number of wavelengths.

As will be appreciated from the foregoing description, the present invention permits the absorption measurement of a sample by using a single light beam, the absorbence measurements of different wavelength by using a double light beam, and the measurements of absorbance characteristic, fluorescence and turbidity through the wavelength scanning. Further, the invention provides a spectrophotometer apparatus which can easily perform selectively the various measurements described above.

Although the invention has been described with reference to preferred embodiments, it should be understood that many modifications and variations are possible without departing from the spirit and scope of the invention as defined in the claims.

We claim:

1. In a spectrophotometer, comprising a light source, a concave for receiving perpendicularly to the grating face thereof a light beam from said light source through an inlet slit, and a detector for detecting a diffracted beam from said concave grating through an exit slit; the improvement wherein said concave grating is composed of a stigmatic concave grating and that at least an exit slit is provided substantially in a plane region encompassed by a meridional image line and a sagittal image line of the diffracted light ray from said stigmatic concave grating.

2. A spectrophotometer as set forth in claim 1, comprising a pair of inlet slits and at least a pair exit slits, wherein the slits of each of said pairs of inlet and exit slits are vertically positioned closely and symmetrically to each other relative to the interposed plane encompassed by said meridional and sagittal image lines of the diffraction ray from said concave grating, and further comprising a sample cell and a reference cell disposed in association with said inlet slits at the side of said light source.

3. A spectrophotometer as set fourth in claim 2, further comprising a third pair of slits disposed at the side of said inlet slits in opposition to said exit slits positioned closest to said inlet slits with the same angular distance from said inlet slits as said exit slits, means for moving said third pair of slits to the position occupied by said pair of inlet slits without changing relative positions among said pair of inlet slits, said pair of exit slits and said third pair of slits, and a pair of detectors disposed independently from said slits at such positions that said detectors are located closely adjacent to said sample and reference cells associated with said pair of inlet slits when said third pair of slits are moved to said position.

4. A spectrophotometer as set forth in claim 3, wherein said concave grating can be rotated about the vertical axis extending through the center thereof.

5. A spectrophotometer as set forth in claim 3, wherein lateral walls of said paired sample and reference cells are made transparent, and said spectrophotometer further comprises a pair of detectors disposed at a lateral side of said paired cell and an optical filter removably disposed between said paired cells and said pair of detectors.

* * * * *